UNITED STATES PATENT OFFICE.

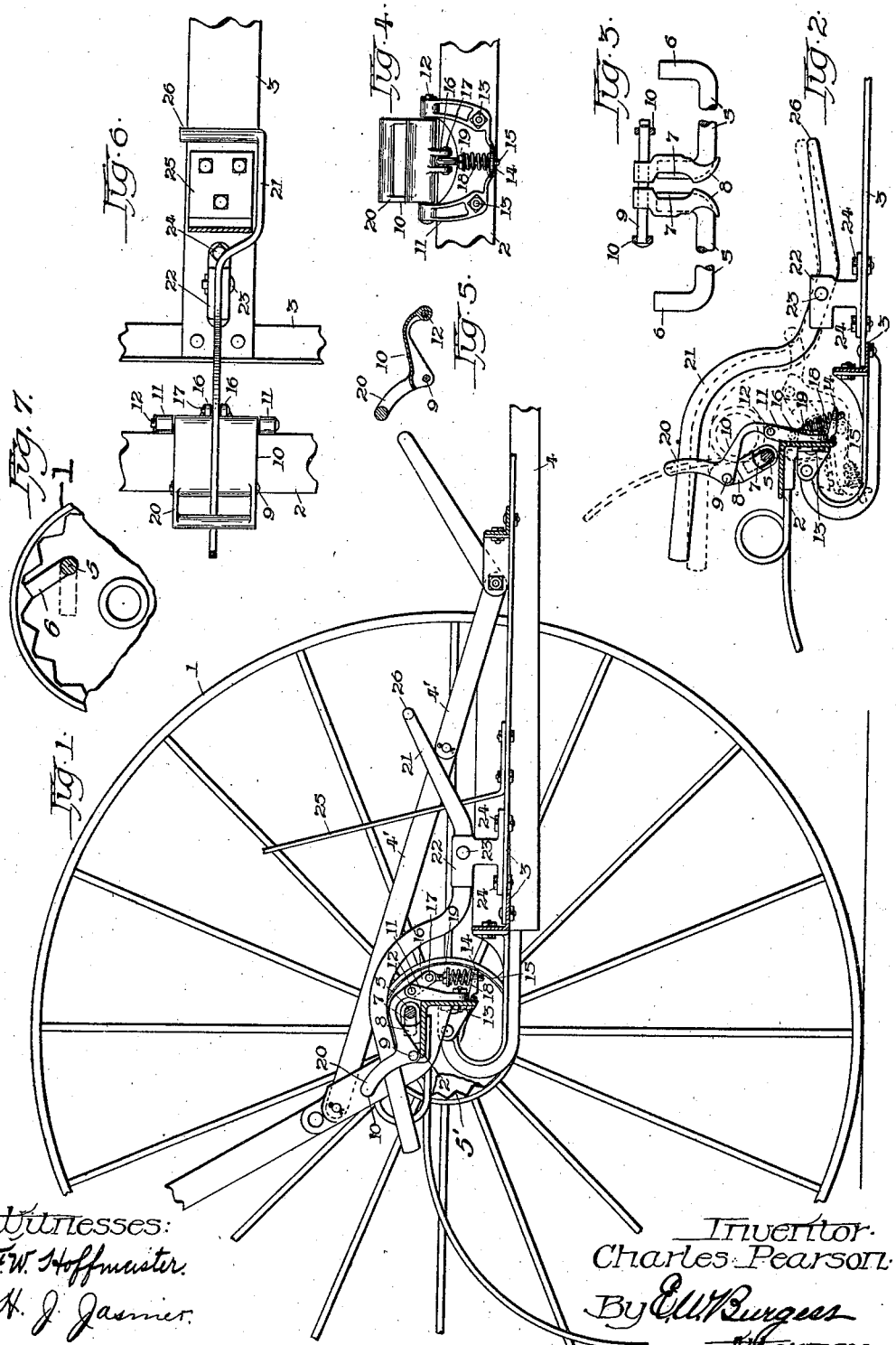

CHARLES PEARSON, OF CHICAGO, ILLINOIS, ASSIGNOR TO INTERNATIONAL HARVESTER COMPANY, A CORPORATION OF NEW JERSEY.

HAY-RAKE.

1,000,438.      Specification of Letters Patent.    Patented Aug. 15, 1911.

Application filed June 2, 1910. Serial No. 564,671.

*To all whom it may concern:*

Be it known that I, CHARLES PEARSON, a citizen of the United States, residing at Chicago, in the county of Cook and State of Illinois, have invented certain new and useful Improvements in Hay-Rakes, of which the following is a specification.

My invention relates to hay rakes of the self-dumping type, and in particular to the tripping mechanism thereof, whereby the tooth carrying heads may be connected with traction wheels in a manner to rock about their axes in dumping the load, the object of my invention being to provide a simple and serviceable mechanism for the purpose required. I attain this object by means of the mechanism illustrated by the accompanying drawing, in which—

Figure 1 is an end elevation of a hay rake, partly in section, having my invention forming a part thereof; Fig. 2 is a detached detail of part of Fig. 1, designed to illustrate the various operative positions of the tripping mechanism; Fig. 3 is a detail illustrating the manner of connecting the inner ends of the divided pawl carrying shaft with part of the tripping mechanism; Fig. 4 is a detail of part of the tripping mechanism; Fig. 5 is a sectional view of part of Fig. 4; Fig. 6 is a top plan view of the tripping mechanism and its associated parts. Fig. 7 is a detached detail designed to illustrate the form of the teeth forming part of the wheel hubs and the manner of their engagement with the load dumping mechanism.

Like reference numerals designate like parts throughout the several views.

1 represents one of the carrying wheels journaled upon an axle secured to a tooth carrying head 2 that is adapted to rock in the usual way about the axis of the carrying wheels in dumping the load.

3 represents a draft frame pivotally connected with the head, 4 represents the thills secured to the lower side of the draft frame, and 4¹ the toggle link connection between the draft frame and the rake head.

5 represents a divided rock shaft having pawls 6 on its opposite ends that are designed to engage with ratchets 5¹ forming part of the hubs of the carrying wheels in a common way in dumping the load, and having their inner ends turned laterally relative to the axis of the shaft, forming adjacent arms 7 that are received by socket members 8 that are provided with transverse openings at their rear ends adapted to receive a cross pin 9 that connects them with the rear end of a lever 10, that is pivotally connected near its forward end with a bracket 11 by means of a pin 12, the bracket being secured to the front leg of the rake head by means of bolts 13.

14 represents an ear integral with the bracket, provided with an opening that slidably receives a link 15 that is pivotally connected with the forwardly extending end 16 of lever 10 by means of a pin 17, and 18 represents a compression spring encircling the link and operative between the ear and the pressure adjusting nut 19 in a manner to yieldingly hold the lever 10 in one position of its operation with the rake in raking position, as shown in Fig. 1, and when the lever is thrown to the position shown in Fig. 2 the spring and link swing rearward in a manner to lock it in tripping position when it is desired to dump the load.

The lever 10 is provided at its rear end with a loop portion 20 that slidably receives the rear end of a tripping lever 21, that curves forward and downward substantially concentric with the axis of movement of the rake head, and is pivotally connected with a bracket 22 by means of a pin 23, the bracket being secured to the draft frame by means of bolts 24, and the lever bent laterally forward of its pivotal connection in order that it may pass below seat spring 25, and then in an opposite direction, forming an arm 26 within convenient reach of the operator's foot, by which it may be manipulated. When the operator presses downward upon the arm 26 the tripping lever 21, at the rear end thereof, swings the lever 10 into the position shown by full lines in Fig. 2, which causes the pawl shaft to rock in its bearings in a manner to clutch the head with the traction wheels and cause it to turn about the axis of the latter and dump the load in a common way, and as the head rocks forward the loop portion of lever 10 slides forward of the tripping lever, following the curve therein in its forward movement, and contacts with the lever at the end of its curved portion in a manner to turn the rock shaft in an opposite direction and release the clutch mechanism.

What I claim as my invention, and desire to secure by Letters Patent, is:

1. A tripping mechanism for hay rakes including, in combination, a rake head, a draft frame pivotally connected with said head, a divided pawl carrying shaft mounted in bearings upon said head, means for rocking said shaft, said means including a lever pivotally connected with said head and said shaft, and a tripping lever pivotally mounted upon said draft frame, the rear end of said tripping lever having a direct sliding connection with said first mentioned lever whereby said first mentioned lever may be rocked about its pivotal connection with said head.

2. A tripping mechanism for hay rakes including, in combination, a rake head, a draft frame pivotally connected with said head, a divided pawl carrying shaft mounted in bearings upon said head and having arms at its middle part turned laterally relative to the axis of the shaft, a controlling lever pivotally mounted upon said head and connected with said arms, and a manually operable tripping lever pivotally mounted upon said draft frame, the rear end of said tripping lever having a direct sliding connection with said controlling lever.

3. A tripping mechanism for hay rakes including, in combination, a rake head, a draft frame pivotally connected with said head, a divided pawl carrying shaft mounted in bearings upon said head and having arms at its middle part turned laterally relative to the axis of the shaft, a controlling lever pivotally mounted upon said head and connected with said arms, a spring connection between said head and said controlling lever adapted to yieldingly retain said controlling lever at either limit of the operative movement thereof, and a manually operable tripping lever pivotally mounted upon said draft frame, the rear end of said tripping lever having a direct sliding connection with said controlling lever.

4. A tripping mechanism for hay rakes including, in combination, a rake head, a draft frame pivotally connected with said head, a divided pawl carrying shaft mounted in bearings upon said head and having arms at its middle part turned laterally relative to the axis of the shaft, a controlling lever having one end pivotally connected with said head and provided with a loop portion at its opposite end, said arms being connected with said controlling lever intermediate its ends, and a manually operable tripping lever pivotally mounted upon said draft frame and having its rear end slidably received by the loop portion of said controlling lever.

5. A tripping mechanism for hay rakes including, in combination, a rake head, a draft frame pivotally connected with said head, a divided pawl carrying shaft mounted in bearings upon said head and having arms at its middle part turned laterally relative to the axis of the shaft, a controlling lever having its forward end pivotally connected with said head and provided with a loop portion at its rear end, said arms being connected with said controlling lever intermediate its ends, said lever being extended forward of its pivotal connection with said head, a spring pressed link connection between the extended end of said lever and the fixed part of said head adapted to yieldingly retain said controlling lever at either limit of its operative movement, and a manually operable tripping lever pivotally mounted upon said draft frame and having its rear end slidably received by the loop portion of said controlling lever.

6. A tripping mechanism for hay rakes including, in combination, a rake head, a draft frame pivotally connected with said head, a divided pawl carrying shaft mounted in bearings upon said head and provided with arms at its middle part turned laterally relative to the axis of the shaft, sockets receiving said arms, a bracket secured to said head, a controlling lever having its forward end pivotally connected with said bracket and provided with a loop portion at its rear end, the said sockets being pivotally connected with said controlling lever intermediate its ends, said lever being extended forward of its pivotal connection with said bracket, a forwardly extending ear integral with said bracket and provided with an opening therein, a link having one end pivotally connected to the extended end of the controlling lever and its opposite end slidably received by the opening in said ear, a pressure regulating nut threaded upon said link, a compression spring encircling said link and operative between said ear and said pressure regulating nut in a manner to yieldingly retain said controlling lever at either limit of its operative movement, and a manually operable tripping lever pivotally mounted upon said draft frame and having its rear end slidably received by the loop portion of said controlling lever.

CHARLES PEARSON.

Witnesses:
FRANK BELKA,
RAY PATTISON.

---

Copies of this patent may be obtained for five cents each, by addressing the "Commissioner of Patents, Washington, D. C."